United States Patent [19]

Chen et al.

[11] Patent Number: 4,668,995
[45] Date of Patent: May 26, 1987

[54] SYSTEM FOR REPRODUCING MIXED IMAGES

[75] Inventors: Yi-Hsin Chen, Croton-on-Hudson; Frederick C. Mintzer, Shrub Oak; Keith S. Pennington, Somers, all of N.Y.

[73] Assignee: International Business Machines Corporation, Armonk, N.Y.

[21] Appl. No.: 722,955

[22] Filed: Apr. 12, 1985

[51] Int. Cl.$^4$ .............................................. H04N 1/40
[52] U.S. Cl. .................................. 358/282; 358/166; 358/283; 358/284; 382/52; 382/54
[58] Field of Search ............... 358/160, 166, 280, 282, 358/283, 284; 382/50, 52, 54

[56] References Cited

U.S. PATENT DOCUMENTS

| | | | |
|---|---|---|---|
| 4,084,196 | 4/1978 | Tisue et al. | 358/283 |
| 4,314,281 | 2/1982 | Wiggins et al. | 358/280 |
| 4,468,704 | 8/1984 | Stoffel et al. | 358/282 |
| 4,503,556 | 3/1985 | Scherl et al. | 358/282 |
| 4,517,604 | 5/1985 | Lasher et al. | 358/282 |
| 4,547,811 | 10/1985 | Ochi et al. | 358/282 |
| 4,554,593 | 11/1985 | Fox et al. | 358/282 |
| 4,577,235 | 3/1986 | Kannapell et al. | 358/280 |

Primary Examiner—Ronald C. Capossela
Attorney, Agent, or Firm—Thomas P. Dowd

[57] ABSTRACT

An electronic processing system for reproducing mixed images, i.e., original images having areas of continuous tone and areas of text, in such a manner that both areas are of balanced, good quality in the reproduction. The image to be reproduced is (1) divided into non-overlapping 4×4 blocks of pixels or picture elements, and, (2) each block is classified as either of TEXT or IMAGE, based on the values of the 16 pixels within it. The classification is improved by (3) eliminating short runs of blocks with the same classification. The pixel values are then adjusted by appropriately (4) thresholding those in the TEXT blocks and, (5) averaging those in the IMAGE blocks. The IMAGE block values are quantized to one of 17 levels using an improved error diffusing process and then mapped onto a 4×4 pattern preparatory to (6) merging the binary images for the TEXT and IMAGE areas. Converting to various patterns to suit the output device such as a specific printer, is possible by permitting the conversion of the bits for an IMAGE block from one pattern table to another.

22 Claims, 4 Drawing Figures

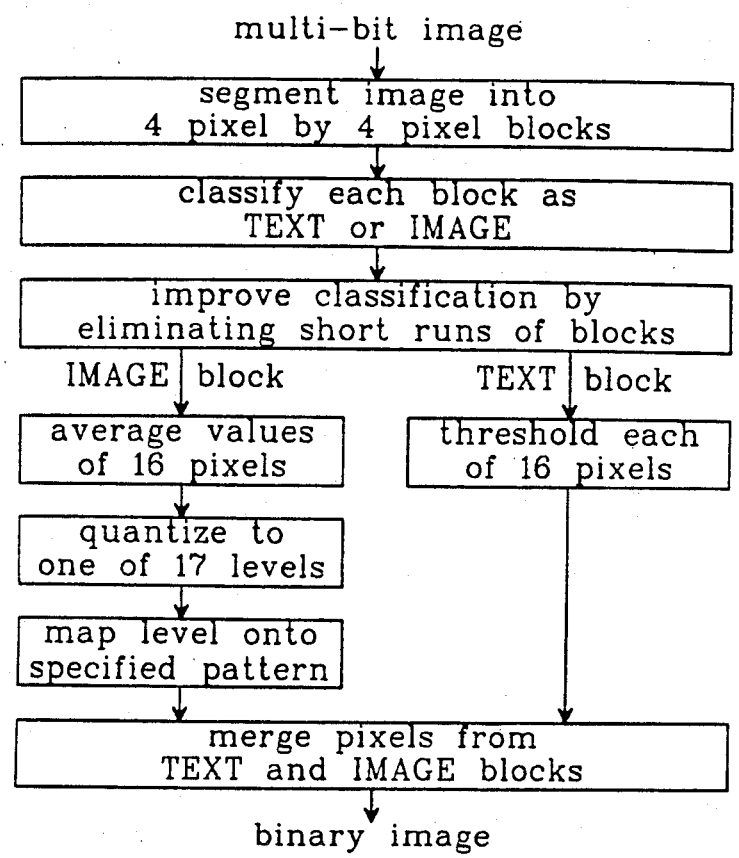
FIG. 1 Flow chart of processing to produce binary representation.
FIG. 2 Block labelling.

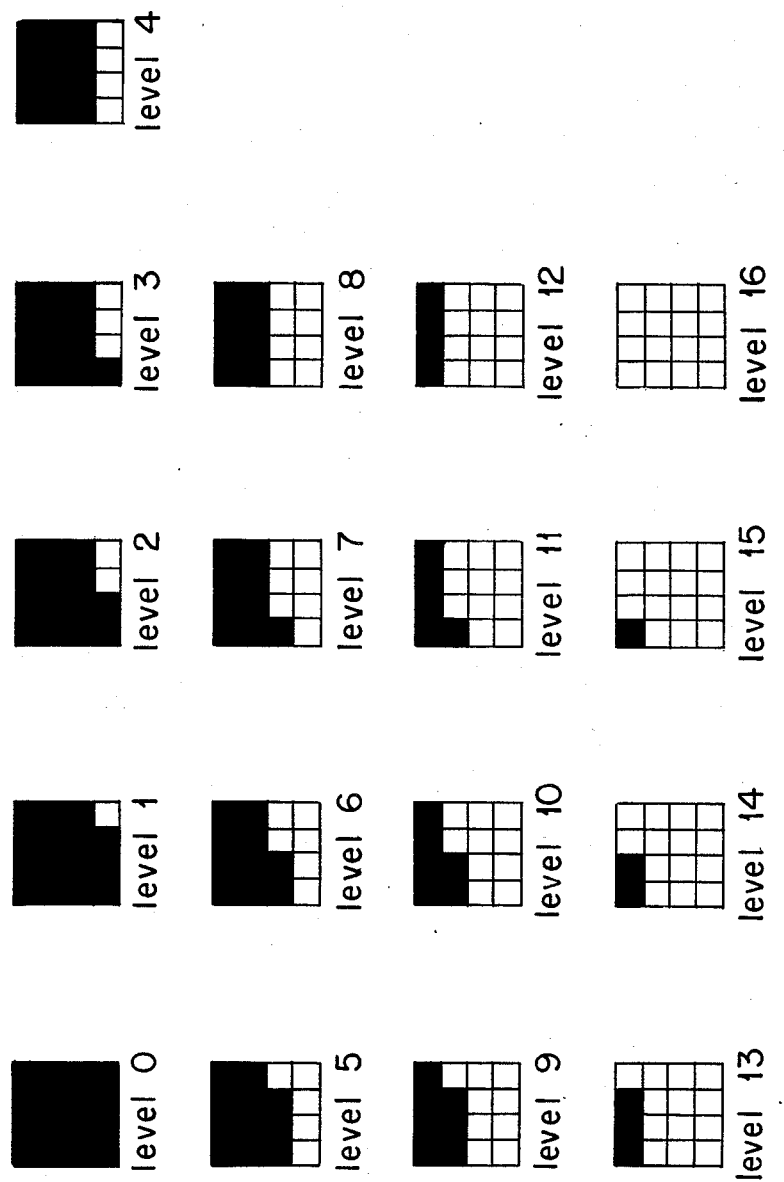

Processing to convert to other halftone pattern sets.

SYSTEM FOR REPRODUCING MIXED IMAGES

BACKGROUND OF THE INVENTION

The present invention relates to the reproduction of electronically processed mixed (text/continuous tone) images and, more particularly, to the conversion of a scanned multi-bit image into a readily compressible binary image capable of reproduction with improved quality in both the text and continuous tone regions.

The reproduction of mixed images using electronic scanning and processing, such as in facsimile systems, poses a particular problem since known processes that work well on graphics or text areas, having sharp black and white edges in the original images, do not work well on continuous tone or gray scale areas, and vice versa. One form of known process for such reproducing involves converting a scanned multi-bit image to a binary image suitable for electronic transmission. An example of such a system is disclosed in U.S. Pat. No. 4,314,281 to Wiggins et al wherein separate modes are used for processing the text areas and the continuous tone areas of an image, the desired mode being manually selected. Typically, in the former mode, continuous tone areas tend to be degraded in reproduction, while in the latter mode text edge quality is sacrificed. The scanned picture elements or pixels are processed one at a time in this system and conversion is accomplished by comparing each multi-bit pixel to one of 16 thresholds stored in a RAM and presented periodically. Compression of the resulting binary images for transmission is problematical.

An example of a known system for converting a multi-bit image to a binary image specifically designed for compression is found in U.S. Pat. No. 4,084,196 to Tisue et al, wherein in one mode the image is divided into non-overlapping blocks containing 3×3 pixels. A quantized level for each block is mapped onto a fixed pattern and the value of each block can be recovered and mapped onto another pattern more appropriate for the output device, which may be a printer. Again, however, different modes are used for text and continuous tone images and one or the other mode is used for processing, resulting in some quality loss. Also, noticeable contours may result in the areas of the reproduction image where the level changes slowly as only the pixels within each block are looked at when producing the output.

The present invention is directed to improving upon these known processes by providing a method and means that deal with both the text and continuous tone areas of an image to be reproduced in the same mode and which produce binary image data in a form that is readily compressible for transmission. Further, the resulting images are of better quality due to a diffused error correction technique.

SUMMARY OF THE INVENTION

The present invention involves an electronic processing system for reproducing mixed images, i.e., original images having areas of continuous tone and areas of text, in such a manner that both areas are of balanced, good quality in the reproduction. More particularly, it is an object of the present invention to take a scanned multi-bit image, i.e., an image, the elements or pixels of which have been digitized according to intensity value into a form represented by more than one bit/pixel, typically 8 bits/pixel, and convert it into a binary image of one bit per pixel, wherein the representation in both the text and continous tone areas is quite good and without contouring artifacts. It is a further object to produce a binary image which compresses very well using existing compression techniques such as those developed for facsimile images including the CCITT-standard Modified Read (MR) algorithm and the IBM-proprietary Modified Modified Read (MMR) algorithm.

According to the invention, the image to be reproduced is (1) divided into non-overlapping 4×4 blocks of pixels or picture elements, and, (2) each block is classified as either of TEXT or IMAGE, based on the values of the 16 pixels within it. The classification is improved by (3) eliminating short runs of blocks with the same classification. The pixel values are then adjusted by appropriately (4) thresholding those in the TEXT blocks and, (5) averaging those in the IMAGE blocks. The IMAGE block values are quantized to one of 17 levels using an improved error diffusing process and then mapped onto a 4×4 pattern preparatory to (6) merging the binary images for the TEXT and IMAGE areas.

The process of the invention also provides a vehicle for converting to various patterns to suit the output device such as a specific printer, by permitting the conversion of the bits for an IMAGE block from one pattern table to another.

BRIEF DESCRIPTION OF THE DRAWINGS

FIG. 1 is a flowchart of the process to convert a multi-bit image into a binary representation in accordance with the present invention.

FIG. 2 illustrates a block of pixels used in the present invention.

FIG. 3 illustrates a set of output pel patterns used in the present invention.

DESCRIPTION OF THE PREFERRED EMBODIMENT

Figure 4:
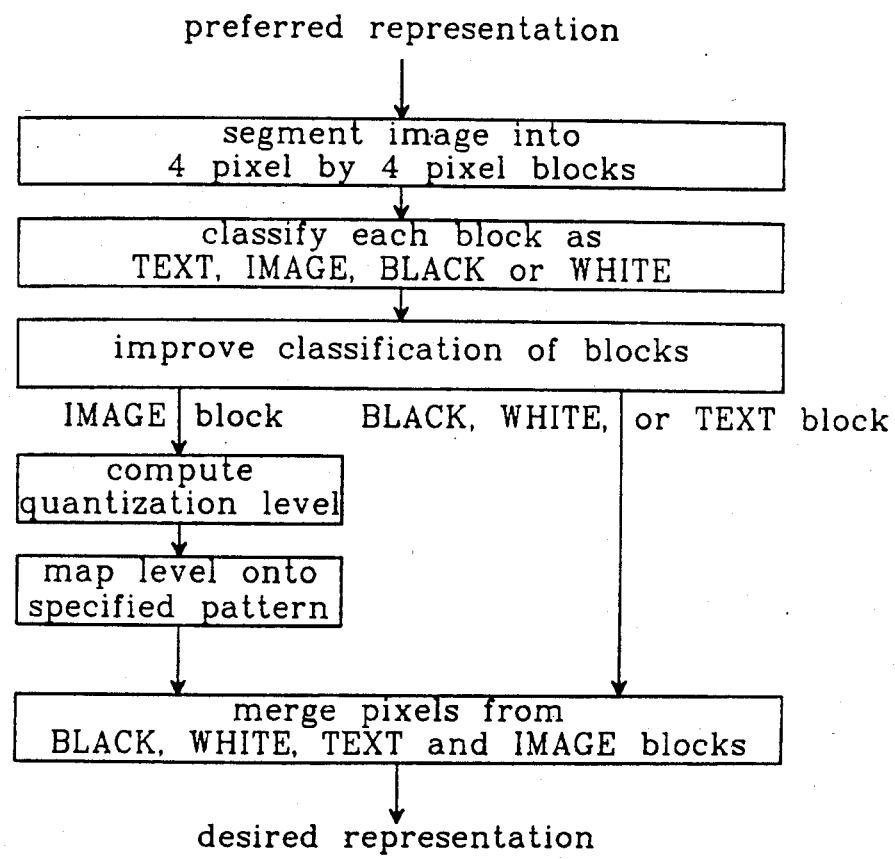
FIG. 4 is a flowchart of the process to convert to other halftone pattern sets.

The IBM 8815 and many other facsimile products scan documents, convert them to binary representations, and compress the binary representations. A binary representation of a document is one in which each picture element, or pixel, is assigned one of two values, e.g., 1 or 0. When the scanned document consists essentially of black strokes on a white background or white strokes on a black background, the binary representation is a good replica of the scanned document and compression algorithms are available that reduce the amount of data by large factors.

The areas of a document that consist essentially of black strokes on a white background or white strokes on a black background, shall be called text areas in the following. However, many documents contain image areas as well. These areas are not essentially black and white; instead they consist of varying shades of gray. Documents that contain both image and text areas are called mixed documents.

In order to represent the image areas of documents with a binary representation, a halftoning algorithm is needed. Halftoning algorithms simulate a gray level by adding black and white dots to a region in the binary representation, with increasing blackness of the gray level of the scanned image corresponding to increasing numbers of black dots in the binary representation.

Although many halftoning algorithms perform well on image areas, they often perform poorly on text areas, creating ragged edges and broken strokes. In order to handle mixed (text/image) documents, it is desirable to have an algorithm that does well in both text and image areas.

Various halftoning methods are available that produce image representations of image regions with acceptable quality, but it is also necessary to consider the halftoning algorithm's effect on compression. When standard facsimile compression algorithms are applied to halftoned images, the compression techniques often expand the amount of data. In some cases data expansion of halftoned images may be by as much as a factor of three.

The present invention processes the multi-bit scan of a document to produce an acceptable binary representation of the document which then readily compresses when processed by standard facsimile compression techniques. The binary representation produced will have sharp edges in text areas, and will simulate continuous tones in the image areas.

The processing algorithm of the invention considers the scan of the document as a sequence of blocks of pixels. Each block of pixels is classified as either TEXT or IMAGE. Those pixels in a block classified as TEXT are simply thresholded. Those pixels in a block classified as IMAGE are first averaged to obtain a single gray-level value for the block. This gray level is then quantized to one of a number of levels, and each level maps onto a pattern of a block of pixels. The quantization process considers the errors introduced in other nearby blocks that have already been quantized. The patterns of pixels associated with the quantization levels are chosen to maximize the compression that can later be obtained by processing the binary representation with a standard facsimile compression technique.

The preferred embodiment uses 8 bits of gray values (0-255) and resolution of 200 picture elements (pel) per inch. With these parameters, a block size of 4 pixels by 4 pixels has proved adequate.

FLOW CHART OF THE PROCESSING

A flow chart of the preferred embodiment of the processing required to convert a multi-bit image to the desired binary representation is given in FIG. 1. In the following, the input pixels are assumed to have multi-bit gray values, with larger values corresponding to whiter input. Output pels are assumed to take on a value of 1 for a black pixel and 0 for a white pixel. As shown, the algorithm proceeds in steps with the succession running in rows from left to right and from top to bottom.

The first step of the processing is a conceptual step in which the image is segmented into non-overlapping blocks consisting of sixteen pixels each, arranged in a four pixel by four pixel square. The pixels of the input image are labelled as $p(i,j)$ for $0 \leq i \leq M-1$ and $0 \leq j \leq N-1$, and block $B(I,J)$ is defined to contain pixels $p(i,j)$ for $4I \leq i \leq 4I+3$ and for $4J \leq j \leq 4J+3$.

CLASSIFICATION OF BLOCKS

The second step of the processing classifies each block as either TEXT or IMAGE. In FIG. 2, the sixteen pixels of a block are shown. The pixel in the upper-left-hand corner of the block is denoted pixel A, the pixel in the upper-right-hand corner of the block is denoted pixel B, the pixel in the lower-left-hand corner of the block is denoted pixel C, and the pixel in the lower-right-hand corner of the block is denoted pixel D. Blocks are classified as TEXT or IMAGE according to the following rule: If any of the pixels A,B,C or D has a value $\geq$ WBAR, then the block is classified as TEXT, if pixels C and D both have values $\leq$ BBAR, then the block is classified as TEXT, otherwise the block is classified as IMAGE. In this classification procedure, WBAR is a fixed threshold chosen such that all levels above it may be considered white and BBAR is a fixed threshold chosen so that all levels below it may be considered black.

IMPROVE CLASSIFICATION OF BLOCKS

The third step of the processing improves the classification of blocks by first eliminating short runs of blocks that are classified as TEXT and by then eliminating short runs of blocks that are classified as IMAGE. A run of TEXT blocks is defined to be a set of consecutive blocks $B(I,J)$ within a row such that the block to the left of the run is not classified as TEXT, the block to the right of the run is not classified as TEXT, and all blocks within the run are classified as TEXT. Similarly, a run of IMAGE blocks is defined to be a set of consecutive blocks $B(I,J)$ within a row such that the block to the left of the run is not classified as IMAGE, the block to the right of the run is not classified as IMAGE, and all blocks within the run are classified as IMAGE. The length of the run is defined as the number of blocks in the run.

The classification is first improved by eliminating all runs of blocks classified as TEXT with run lengths less than MINRUN blocks and with at least one IMAGE block in the prior row above a block in the TEXT run. Eliminating a run of TEXT blocks means changing the classification of all blocks in that run to IMAGE. The classification is then improved by eliminating all runs of blocks classified as IMAGE with run lengths less than MINRUN blocks, where eliminating a run of IMAGE blocks means changing the classification of all blocks in that run to TEXT. In a typical implementation, MINRUN may be set to 6.

After the third step of the processing, in which the classification is improved, each row of input blocks is processed block by block. The processing of each block is dependent on its classification.

A block classified as TEXT is processed using a fixed threshold scheme. Each of the pixels $p(i,j)$ of the block is compared with a fixed threshold, THRESH. If $p(i,j)$ is less than THRESH, then the corresponding output pel, $o(i,j)$, is set to 1, indicating a black output pel. Otherwise, the output $o(i,j)$ is set to 0. Processing of a block classified as IMAGE:

The first step of processing a block classified as IMAGE consists of calculating the average gray level of an IMAGE block, $a(I,J)$. The values of the sixteen pixels of the block are summed and the sum is divided by sixteen. $a(I,J)$ is assigned this value.

The second step of processing a block classified as IMAGE consists of quantizing the average gray value of the block to one of seventeen discrete levels (0,1, ..., 16), such as might be produced by a printer capable of printing a set of output pel patterns having a respective set of gray values, by the following steps: First, a modified average of the block, $A(I,J)$ is calculated as $$A(I,J) = a(I,J) + (e(I-1,J) + e(I,J-1))/2.$$

This modified average is the sum of the average value of this block plus a weighted average of the quantization errors of neighboring blocks already quantized. Next the quantity Q is calculated as $$Q=[(A(i,j)-BBAR)/[(WBAR-BBAR)/16]],$$

where [x] is the greatest integer less than or equal to x. The quantization level of the block, q(I,J), is then assigned according to the rule:

If Q>16, then q(I,J)=16, if Q<0, then q(I,J)=0, otherwise, q(I,J)=Q. The quantization error of the block, e(I,J), is then calculated as $$e(I,J)=A(I,J)-(BBAR+q(I,J) * [(WBAR-BBAR)/16]).$$

This quantization scheme may be called "quantization error diffusion." A scheme called "error diffusion" (e.g., see "Digital Halftoning of Images" by D. Anastassiou and K. S. Pennington, IBM Journal of Research and Development, vol. 26, No. 6, 687–697, November 1982) operates at the pixel level, quantizing to two levels. "Quantization error diffusion" operates at the block level, and quantizes the block average to one of a multiplicity of levels.

In the third and final step of processing for an IMAGE block, the block quantization level, q(I,J), is mapped onto a unique four pixel by four pixel binary pattern. The complete set of these patterns is given in FIG. 3. The four by four pattern sets the sixteen pels in the output block.

The final stage of processing combines those bit-maps produced by processing the blocks classified as TEXT and those produced by processing the blocks classified as IMAGE. The output image is merely the merger of the two sets of output blocks.

CONVERSION TO OTHER HALFTONE PATTERN SETS

Flow chart of the processing

The halftone patterns given in FIG. 3, when used with the procedure described above, render a binary representation which has good quality. However, in continuous-tone image regions this representation may contain the texture of horizontal lines, which may be objectionable in some applications. In these situations it is recommended that the binary image, constructed as described above, be modified at print time so that the patterns of FIG. 3 are replaced by another set of patterns in continuous-tone image areas. In the following, the binary image constructed as described above will be called the "preferred representation". The image constructed with the replacement patterns will be called the "replacement representation".

A flow chart of the processing required to convert the preferred representation to the replacement representation is given in FIG. 4. As shown in the figure, this processing proceeds by steps, a detailed description of which follows.

SEGMENTATION INTO BLOCKS

The first step of the processing is a conceptual step in which the image is segmented into non-overlapping blocks consisting of sixteen pels each, arranged in a four pixel by four pixel square. The pels of the input image are labelled as p(i,j) for $0 \le i \le M-1$ and $0 \le j \le N-1$, and block B(I,J) is defined to contain pels p(i,j) for $4I \le i \le 4I+3$ and for $4J \le j \le 4J+3$.

CLASSIFICATION OF BLOCKS

The second step of the processing classifies each block as either TEXT, IMAGE, WHITE, or BLACK according to the following rule:
   If all sixteen pels of the block are black, then classify the block as BLACK,
   if all sixteen pels of the block are white, then classify the block as WHITE,
   if the block matches one of the patterns of FIG. 3 associated with levels 1 though 15, then classify the block as IMAGE,
   otherwise classify the block as TEXT.

IMPROVE CLASSIFICATION OF BLOCKS

The third step of the processing improves the block classifications. First, short runs of WHITE blocks are eliminated. A run of WHITE blocks is defined to be a set of consecutive blocks within a row of blocks such that the block to the left of the run is not classified as WHITE, the block to the right of the run is not classified as WHITE, and all the blocks within the run are classified as WHITE. Short runs of WHITE blocks, those with run lengths less than MINRUN, are eliminated according to the following rule:
   If the WHITE run is followed by an IMAGE block, then reclassify all blocks in the run as IMAGE blocks, otherwise reclassify all white blocks in the run as TEXT.

Next, the classification of IMAGE blocks is improved by examining prior and subsequent rows. If block B(I,J) is classified as IMAGE, block B(I+1,J) is classified as TEXT, and block B(I−1,J) is not classified as IMAGE, then reclassify block B(I,J) as TEXT. Lastly, the classification is improved by processing short runs of IMAGE blocks. If the run length of a run of IMAGE blocks is less than MINRUN, then all blocks in the run are reclassified as TEXT. Again in a typical implementation, minrun may be set to 6.

CLASSIFICATION DEPENDENT PROCESSING OF BLOCKS

After the third step of the processing, in which the classification is improved, each row of input blocks is processed block by block. The processing of each block is dependent on its classification.

PROCESSING OF A BLOCK CLASSIFIED AS TEXT

A block classified as BLACK, WHITE, or TEXT requires no further processing. The output pels for these blocks are identical to the input pels. Processing of a block classified as IMAGE:

The first step of processing a block classified as IMAGE consists of calculating the block quantization level, q(I,J). This value is computed as the number of white pels in the block.

The second step of processing for an IMAGE block consists of mapping the block quantization level, q(I,J), onto a four pixel by four pixel binary pattern. Any desired set of four pixel by four pixel binary patterns may be used. However, to preserve the proper gray shade, the four pixel by four pixel pattern associated with a given level should contain a number of white pels equal to q(I,J).

The final stage of processing combines those bit-maps produced by processing the blocks classified as WHITE, BLACK, or TEXT with those produced by processing the blocks classified as IMAGE. The output image is merely the merger of the two sets of output blocks.

We claim:

1. A method for converting a scanned multi-bit image of pixels into a binary image of pels suitable for compression and printout on a printer having the capability to print a set of $n^2+1$ output pel patterns producing a respective set of discrete gray values, comprising the steps of:

dividing the pixels of said scanned image into rows of non-overlapping blocks of n x n pixels;

choosing a threshold value W, above which a pixel intensity value is considered to be white and a threshold value B, below which a pixel intensity value is considered to be black;

determining the intensity values of the four corner pixels of each block;

classifying a block as TEXT, if any of said four corner pixels has an intensity value equal to or greater than W or if the two lower corner pixels both have an intensity value less than or equal to B, otherwise classifying a block as IMAGE;

then, eliminating short runs of adjacent TEXT blocks in a row by reclassifying them to IMAGE blocks if the number of such adjacent TEXT blocks is below a selected minimum number MI, and there is at least one IMAGE block in the preceding row immediately above at least one of the TEXT blocks in the run;

then, eliminating short runs of adjacent IMAGE blocks in a row by reclassifying them to TEXT blocks if the number of such adjacent IMAGE blocks is below the selected minimum number MIN;

selecting a threshold value T and comparing the values of the pixels of the blocks classified as TEXT thereto;

setting the corresponding output pel for each pixel of a TEXT block having a value less than said threshold value T to 1, otherwise setting said output pel to 0;

determining the average gray value of each block classified as IMAGE by summing the intensity values of the $n^2$ pixels therein and dividing the sum by $n^2$;

comparing the average gray value of a first IMAGE block with the set of $n^2+1$ discrete gray values of said printer and selecting the discrete gray value closest to its average gray value for said first IMAGE block, the error being the difference between its average gray value and the selected discrete gray value;

distributing said error to the adjacent IMAGE blocks to the right and below said first IMAGE block;

continuing the error distribution by:

determining a modified average gray value for subsequent blocks classified as IMAGE by adding to their average gray value one half the sum of the errors distributed to them from IMAGE blocks adjacent to the left and above;

comparing the modified average gray values of the subsequent IMAGE blocks with the set of $n^2+1$ discrete gray values of said output pel patterns and selecting the respective discrete gray values closest to their modified average gray values, the errors being the difference between their modified average gray values and the selected discrete gray values;

choosing output pel patterns for said subsequent IMAGE blocks corresponding to their selected discrete gray values; and merging the output pels of said TEXT blocks with the output pel patterns of said IMAGE blocks.

2. A system for reproducing images having areas of text and of continuous tone the pixels of which have been converted to data in binary format according to their intensity values, comprising:

means for dividing said data into non-overlapping blocks of n by n pixels;

means for classifying said blocks as either of TEXT or IMAGE, based on the intensity values of selected pixels of the $n^2$ pixels within each and comprising:

means for setting a threshold value W, above which a pixel intensity value is considered to be white;

means for setting a threshold value B, below which a pixel intensity value is considered to be black;

means for determining the intensity values of the four corner pixels of each said block;

first means for classifying a block as TEXT, if any of said four corner pixels has an intensity value equal to or greater than W;

second means for classifying a block as TEXT, if the two lower corner pixels both have an intensity value less than or equal to B; and third means for classifying a block as IMAGE in the absence of a TEXT classification by said first and second means;

means for eliminating short runs of blocks with the same classification;

means for thresholding the values of the pixels in the TEXT blocks;

means for averaging the values of the pixels in the IMAGE blocks;

means for then quantizing the values of the pixels in the IMAGE blocks;

means for choosing output pel patterns for said quantized IMAGE blocks corresponding to their quantized gray values; and means for merging the pels of the thresholded TEXT blocks and the pel patterns of the quantized IMAGE blocks into a binary image.

3. A system as in claim 2, wherein said means for eliminating short runs of blocks with the same classification comprises:

means for eliminating short runs of adjacent TEXT blocks in a row by reclassifying them to IMAGE blocks if the number of such adjacent TEXT blocks is below a selected minimum number MIN, and there is at least one IMAGE block in the preceding row immediately above at least one of the TEXT blocks in the run.

4. A system as in claim 3, wherein said means for eliminating short runs of blocks with the same classification further comprises:

means for eliminating short runs of adjacent IMAGE blocks in a row by reclassifying them to TEXT blocks if the number of such adjacent IMAGE blocks is below said selected minimum number MIN.

5. A system as in claim 2, wherein said means for thresholding the values of the pixels in the TEXT blocks comprises:
   means for selecting a threshold value and comparing the values of the pixels of the blocks classified as TEXT thereto;
   means for setting the corresponding output pel for each pixel of a TEXT block having a value less than said threshold value to 1; and
   means for setting the corresponding output pel for each pixel of a TEXT block having a value greater than said threshold value to 0.

6. A system as in claim 2, wherein said means for averaging the values of the pixels in the IMAGE blocks comprises:
   means for determining the average gray value of each block classified as IMAGE by summing the intensity values of the $n^2$ pixels therein and dividing the sum by $n^2$.

7. A system for reproducing images having areas of text and of continuous tone the pixels of which have been converted to data in binary format according to their intensity values, comprising:
   printer means for printing a set of pel patterns having $n+1$ discrete gray values; and
   means for dividing said data into non-overlapping blocks of n by n pixels;
   means for classifying said blocks as either of TEXT or IMAGE, based on the intensity values of selected pixels of the $n^2$ pixels within each;
   means for eliminating short runs of blocks with the same classification;
   means for thresholding the values of the pixels in the TEXT blocks;
   means for averaging the values of the pixels in the IMAGE blocks;
   means for then quantizing the values of the pixels in the IMAGE blocks, said quantizing means comprising:
   means for comparing the average gray value of a first IMAGE block with the set of $n^2+1$ discrete gray values of said printer means;
   means for selecting the discrete gray value closest to said average gray value for said first IMAGE block;
   means for determining the difference between said average gray value and said selected discrete gray value for said first IMAGE block, said difference being the error; and
   means for distributing said error to the adjacent IMAGE blocks to the right and below said first IMAGE block;
   means for choosing output pel patterns for said quantized IMAGE blocks corresponding to their quantized gray values; and
   means for merging the pels of the thresholded TEXT blocks and the pel patterns of the quantized IMAGE blocks into a binary image.

8. A system as in claim 7, further comprising means for continuing the error distribution comprising:
   means for determining a modified average gray value for subsequent blocks classified as IMAGE by adding to their average gray value one half the sum of the errors distributed to them from IMAGE blocks adjacent to the left and above;
   means for comparing the modified average gray values of the subsequent IMAGE blocks with the set of $n^2+1$ discrete gray values of said printer means and selecting the respective discrete gray values closest to their modified average gray values, the respective errors to be distributed being the differences between the respective modified average gray values and the selected discrete gray values; and
   means for choosing output pel patterns for said subsequent IMAGE blocks corresponding to their selected discrete gray values.

9. A system as in claim 8, further comprising means for merging the output pels of said thresholded TEXT blocks with the output pel patterns of said quantized IMAGE blocks.

10. A system as in claim 8, wherein said choosing means comprises means for selecting the pel pattern at each gray value best suited for compression by subsequent processing using a run-length based compression technique.

11. A system as in claim 10 wherein said run-length based compression technique comprises the CCITT-standard Modified Read (MR) algorithm.

12. A process for reproducing images having areas of text and of continuous tone the pixels of which have been converted to data in binary format according to their intensity values, comprising the steps of:
   dividing said data into non-overlapping blocks of n by n pixels;
   classifying said blocks as either of TEXT or IMAGE, based on the intensity values of selected pixels of the $n^2$ pixels within each, by the steps comprising:
   setting a threshold value W, above which a pixel intensity value is considered to be white;
   setting a threshold value B, below which a pixel intensity value is considered to be black;
   determining the intensity values of the four corner pixels of each said block;
   classifying a block as TEXT, if any of said four corner pixels has an intensity value equal to or greater than W;
   classifying a block as TEXT, if the two lower corner pixels both have an intensity value less than or equal to B;
   classifying a block as IMAGE in the absence of a TEXT classification in the two preceding steps;
   and after classification:
   eliminating short runs of blocks with the same classification;
   thresholding the values of the pixels in the TEXT blocks;
   averaging the values of the pixels in the IMAGE blocks;
   then quantizing the values of the pixels in the IMAGE blocks;
   choosing output pel patterns for said quantized IMAGE blocks corresponding to their quantized gray values; and
   merging the pels of the thresholded TEXT blocks and the pel patterns of the quantized IMAGE blocks into a binary image.

13. A process as in claim 12, wherein said step of eliminating short runs of blocks with the same classification comprises:
   eliminating short runs of adjacent TEXT blocks in a row by reclassifying them to IMAGE blocks if the number of such adjacent TEXT blocks is below a selected minimum number MIN, and there is at least one IMAGE block in the preceding row immediately above at least one of the TEXT blocks in the run.

14. A process as in claim 13, wherein said step of eliminating short runs of blocks with the same classification further comprises:
   eliminating short runs of adjacent IMAGE blocks in a row by reclassifying them to TEXT blocks if the number of such adjacent IMAGE blocks is below said selected minimum number MIN.

15. A process as in claim 12, wherein said step of thresholding the values of the pixels in the TEXT blocks comprises:
   selecting a threshold value and comparing the values of the pixels of the blocks classified as TEXT thereto;
   setting the corresponding output pel for each pixel of a TEXT block having a value less than said threshold value to 1; and
   setting the corresponding output pel for each pixel of a TEXT block having a value greater than said threshold value to 0.

16. A process as in claim 12, wherein said step of averaging the values of the pixels in the IMAGE blocks comprises:
   determining the average gray value of each block classified as IMAGE by summing the intensity values of the $n^2$ pixels therein and dividing the sum by $n^2$.

17. A process for reproducing images having areas of text and of continuous tone the pixels of which have been converted to data in binary format according to their intensity values, comprising the steps of:
   establishing a table for printing a set of pel patterns having $n^2+1$ discrete gray values; and
   dividing said data into non-overlapping blocks of n by n pixels;
   classifying said blocks as either of TEXT or IMAGE, based on the intensity values of selected pixels of the n2 pixels within each;
   eliminating short runs of blocks with the same classification;
   thresholding the values of the pixels in the TEXT blocks;
   averaging the values of the pixels in the IMAGE blocks;
   then quantizing the values of the pixels in the IMAGE blocks, said quantizing step comprising:
      comparing the average gray value of a first IMAGE block with the set of $n^2+1$ discrete gray value of said pel patterns;
      selecting the discrete gray value closest to said average gray value for said first IMAGE block;
      determining the difference between said average gray value and said selected discrete gray value for said first IMAGE block, said difference being the error;
      distributing said error to the adjacent IMAGE blocks to the right and below said first IMAGE block;
      choosing output pel patterns for said quantized IMAGE blocks corresponding to their quantized gray values; and
      merging the pels of the thresholded TEXT blocks and the pel patterns of the quantized IMAGE blocks into a binary image, 18. A process as in claim 17, wherein the error distribution is continued by the steps comprising:
   determining a modified average gray value for subsequent blocks classified as IMAGE by adding to their average gray value one half the sum of the errors distributed to them from IMAGE blocks adjacent to the left and above;
   comparing the modified average gray values of the subsequent IMAGE blocks with the set of $n^2+1$ discrete gray values of said pel patterns and selecting the respective discrete gray values closest to their modified average gray values, the respective errors to be distributed being the differences between the respective modified average gray values and the selected discrete gray values; and
   choosing output pel patterns for said subsequent IMAGE blocks corresponding to their selected discrete gray values.

19. A process as in claim 18, comprising the further step of merging the output pels of said thresholded TEXT blocks with the output pel patterns of said quantized IMAGE blocks.

20. A process as in claim 18, comprising the further step of converting the output pel patterns of said image blocks from one pattern table to another.

21. A process as in claim 18, wherein said choosing step comprises selecting the pel pattern at each gray value best suited for compression by subsequent processing using a run-length based compression technique.

22. A process as in claim 21 wherein said run-length based compression technique comprises the CCITT-standard Modified Read (MR) algorithm.

* * * * *